(12) United States Patent
Yi et al.

(10) Patent No.: US 11,994,923 B2
(45) Date of Patent: May 28, 2024

(54) DONGLE AND METHOD FOR CONTROLLING POWER DELIVERY

(71) Applicant: Realtek Semiconductor Corp., HsinChu (TW)

(72) Inventors: Liu Yi, Suzhou (CN); Dandan Zhu, Suzhou (CN); Yuan Deng, Suzhou (CN); Congyu Zhang, Suzhou (CN); Neng-Hsien Lin, HsinChu (TW); Tsung-Tao Wu, HsinChu (TW); Fan-Hau Hsu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 193 days.

(21) Appl. No.: 17/745,895

(22) Filed: May 17, 2022

(65) Prior Publication Data
US 2023/0004202 A1    Jan. 5, 2023

(30) Foreign Application Priority Data
Jul. 2, 2021  (CN) ......................... 202110749886.X

(51) Int. Cl.
*G06F 1/26*  (2006.01)

(52) U.S. Cl.
CPC .................................... *G06F 1/266* (2013.01)

(58) Field of Classification Search
CPC .... G06F 1/266; G06F 1/26; H02J 3/00; H02J 13/00006
See application file for complete search history.

(56) References Cited

U.S. PATENT DOCUMENTS

| | | | |
|---|---|---|---|
| 2014/0289540 A1* | 9/2014 | Hsu | G06F 1/28 713/300 |
| 2015/0362984 A1* | 12/2015 | Waters | G06F 1/3287 713/324 |
| 2016/0173678 A1* | 6/2016 | DeCamp | G06F 1/266 455/557 |
| 2016/0191256 A1* | 6/2016 | Wendt | G06F 1/26 713/300 |
| 2017/0293347 A1* | 10/2017 | Wood, III | G06F 1/26 |
| 2020/0073455 A1* | 3/2020 | Na | G06F 13/4282 |

\* cited by examiner

*Primary Examiner* — Jaweed A Abbaszadeh
*Assistant Examiner* — Brian J Corcoran
(74) *Attorney, Agent, or Firm* — Winston Hsu

(57) ABSTRACT

A dongle coupled between a power supplying device for supplying power and a power receiving device for receiving power includes a downstream facing port (DFP), an upstream facing port (UFP) and a controller. The controller is arranged to control deliveries of the power and messages between the power supplying device and the power receiving device. In response to a first power request message received from the power receiving device, the controller is arranged to determine whether a power type request by the power receiving device is Programmable Power Supply (PPS) according to the first power request message. When determining that the power type request by the power receiving device is PPS, the controller is arranged to start first waiting timer, and when the first waiting timer expires, the controller is arranged to send a request accept message to the power receiving device through the UFP.

17 Claims, 4 Drawing Sheets

DONGLE AND METHOD FOR CONTROLLING POWER DELIVERY

BACKGROUND OF THE INVENTION

1. Field of the Invention

The invention relates to a dongle, more particular to a dongle capable of supporting Power Delivery (PD) of Programmable Power Supply (PPS).

2. Description of the Prior Art

Programmable Power Supply (PPS) is a new standard for power delivery, which makes the power supplying device (that is, the source) to be able to dynamically adjust output voltage and current based on the power negotiation result between the power receiving device (that is, the sink) and the power supplying device every ten seconds. The range of the transmitted voltage specified by the PPS standard is 3-21 volts (V), and the voltage adjustment step is 0.02V. Besides improving charging efficiency, the PPS standard further reduces the heat generation at the power receiving device during the charge.

With the function of the consumer electronic products (e.g. the mobile phones) becoming more powerful, the time that the users hold and use the consumer electronic products is increased and the power consumption speed of the consumer electronic products is getting faster. As a result, the needs for fast charging the consumer electronic products become strong.

In view of this, there is a need to develop more devices that are capable of supporting fast charging. A dongle that is capable of supporting power delivery of PPS is required so as to meet the needs in the market.

SUMMARY OF THE INVENTION

The objective of the invention is to develop the associated method of controlling power delivery for a dongle capable of supporting power delivery of PPS.

According to an embodiment of the invention, a dongle coupled between a power supplying device which supplies power and a power receiving device which receives the power. The dongle comprises a downstream facing port (DFP), arranged to be coupled to the power supplying device, an upstream facing port (UFP) arranged to be coupled to the power receiving device, and a controller coupled to the DFP and the UFP and arranged to control deliveries of the power and messages between the power supplying device and the power receiving device. In response to a first power request message received from the power receiving device, the controller is arranged to determine whether a power type request by the power receiving device is Programmable Power Supply (PPS) according to the first power request message. If the power type request by the power receiving device is PPS, the controller is arranged to start a first waiting timer, and when the first waiting timer expires, the controller is arranged to send a request accept message to the power receiving device through the UFP.

According to another embodiment of the invention, a method for controlling power delivery between a power supplying device arranged to supply power and a power receiving device arranged to receive the power comprises: determine whether a power type request by the power receiving device is Programmable Power Supply (PPS) according to a first power request message received from the power receiving device; starting a first waiting timer if the power type request by the power receiving device is PPS; and sending a request accept message to the power receiving device when the first waiting timer expires.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
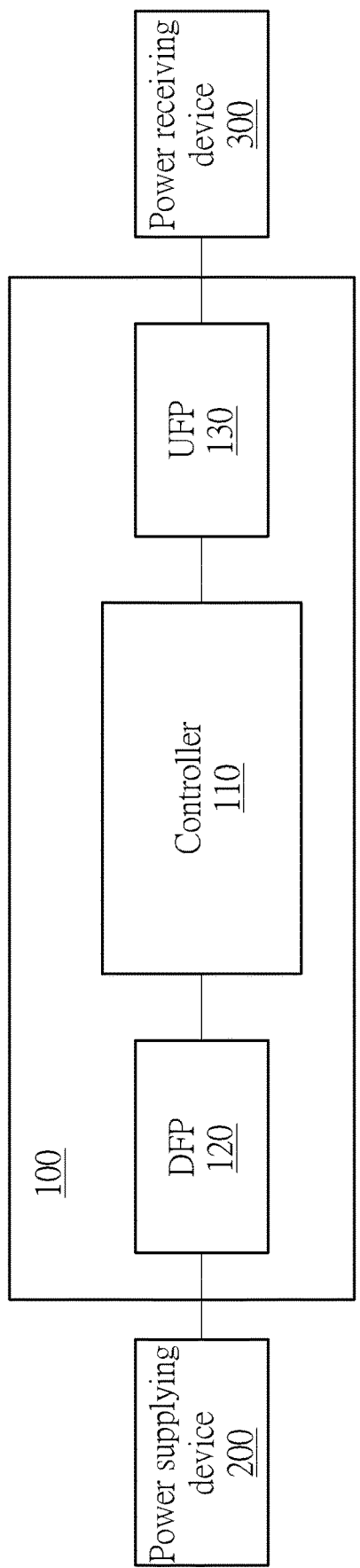
FIG. 1 is an exemplary block diagram of a power delivery system according to an embodiment of the invention.

FIG. 1 is an exemplary block diagram of a power delivery system according to an embodiment of the invention. The power delivery system may comprise a dongle 100, a power supplying device 200 and a power receiving device 300. The power supplying device 200 may also be referred to as a source for supplying power in the power delivery system. The power receiving device 300 may also be referred to as a sink or a sink device for receiving power in the power delivery system. The dongle 100 is coupled between the power supplying device 200 and the power receiving device 300 for controlling the delivery of power and the delivery of messages between the power supplying device 200 and the power receiving device 300.

The dongle 100 may at least include a controller 110, a Downstream Facing Port (DFP) 120 arranged to be coupled to the power supplying device 200, and an Upstream Facing Port (UFP) 130 arranged to be coupled to the power receiving device 300. The controller 110 is coupled to the DFP 120 and UFP 130, and is arranged to control the delivery of power and messages between the power supplying device 200 and the power receiving device 300. As an example, the dongle 100 may evaluate the content of the received power request and bypass the received power and message between the power supplying device 200 and the power receiving device 300. In addition, the controller 110 may maintain a state machine respectively for the DFP 120 and UFP 130, so as to control the operations of the DFP 120 and UFP 130.

According to an embodiment of the invention, the dongle 100 may be a Universal Serial Bus (USB) Type C dongle, and may support the power delivery (PD) of Programmable Power Supply (PPS). In an embodiment of the invention, the dongle 100 may also be combined or integrated with the power supplying device 200 to form a power supplying device supporting PPS, as an example, the dongle 100 may be connected to the power supplying device 200 through the DFP 120 to form an adapter or a charger supporting PPS, and may output power that supports PPS or complies with the PPS standards through the UFP 130.

According to an embodiment of the invention, in a situation where the DFP 120 and UFP 130 are respectively connected to the power supplying device 200 and the power receiving device 300, when the dongle 100 is sourced with power, an initialization procedure may be performed, and the initialization procedure may comprise the operations of sequentially establishing a Type C link and establishing a PPS PD link between the power supplying device 200 and DFP 120, and a PPS PD link between the power receiving device 300 and UFP 130 respectively.

After the PD link is established, the power receiving device 300 may start sending power requests to the UFP 130, and the power requests will be passed to the power supplying device 200 by the dongle 100.

In response to a received power request, the controller 110 of the dongle 100 may first evaluate whether the power requested by the power receiving device 300 is available power (that is, whether the dongle 100 is able to supply the power requested by the power receiving device 300). As an example, whether the power requested by the power receiving device 300 is available power may be determined according to the specifications of the configured hardware of the dongle 100 and the contents of the software and firmware programs. If the determination result shows yes, the power request is further passed to the power supplying device 200. If the determination result shows no, the dongle 100 may ignore the received power request or may issue a request reject message to the power receiving device 300.

Based on the PPS standards, when the amount of power change requested by the power receiving device 300 is less than 500 millivolts (mV), the power supplying device 200 must complete the power adjustment within 25 milliseconds (ms) after replying a request accept message, and send a power ready message to the power receiving device 300. However, in the normal situation where an intermediate device, such as a dongle, is coupled between the power supplying device 200 and the power receiving device 300 in the power delivery system, such a dongle is usually unable meet the requirement of completing the task of power adjustment within 25 milliseconds. The reason that a general dongle fails to meet the requirement is that, after evaluating the power requested by the power receiving device is an available power, such general dongle will immediately reply a request accept message to the power receiving device 300, and then pass the power request to the power supplying device 200. In response to the received power request, the power supplying device 200 must start to adjust the power after evaluating the request and send a power ready message after the power adjustment is completed. However, the overall procedure is very time consuming so that a general dongle is considered unable to meet the requirement of completing the task of power adjustment within 25 milliseconds.

To solve the problems, one or more delays are properly added in the power delivery procedure of the proposed dongle 100, for controlling the power delivery between the power supplying device and the power receiving device, and make the overall power delivery procedure be in compliance with PPS standards.

According to an embodiment of the invention, as described above, after the PD link is established, the power receiving device 300 may send a first power request message to the power supplying device 200 through the dongle 100.

In response to the first power request message received from the power receiving device 300, the controller 110 may first evaluate whether the power requested by the power receiving device 300 is available power as described above. The power request message may comprise information regarding the voltage level, the current level and the power type requested by the power receiving device 300. When the power requested by the power receiving device 300 is not available, the dongle 100 may ignore the received power request or may issue a request reject message to the power receiving device 300. It is to be noted that for simplicity, the embodiments are all provided on the basis that the power requested by the power receiving device 300 is available (i.e., can be supplied by the dongle 100).

When the power requested by the power receiving device 300 is available power, the dongle 100 may further determine whether a power type request by the power receiving device 300 is PPS according to the content (e.g., parameters) of the first power request message. When determining that the power type request by the power receiving device is not PPS, the controller 110 is arranged to directly send a request accept message to the power receiving device 300 through the UFP 130 for responding to the first power request message, and provide the first power request message to the power supplying device 200 through the DFP 120. On the other hand, when determining that the power type request by the power receiving device is PPS, the controller 110 is arranged to start a first waiting timer, so as to delay the time of sending the request accept message. The controller 110 is arranged to drive the DFP 120 during the waiting period (for the first waiting time corresponding to the first waiting timer), so as to send the first power request message to the power supplying device 200 through the DFP 120. In an embodiment of the invention, before the first waiting timer expires, the controller is arranged to temporarily not deliver a request accept message to the power receiving device 300 through the UFP 130, but will bypass the first power request message to the power supplying device 200 through the DFP 120. According to an embodiment of the invention, when the first waiting timer expires, the controller 110 is arranged to send a request accept message to the power receiving device 300 through the UFP 130 for responding to the first power request message.

According to another embodiment of the invention, when it is determined that the power type requested by the power receiving device 300 is PPS, the controller 110 is further arranged to determine an amount of change in requested voltage (i.e., an amount of change in requested power) based on the first power request message and a previously received power request message (i.e., the power request message previously from the power receiving device 300), and determine whether the amount of change in requested voltage is greater than a predetermined value. In the embodiments of the invention, the predetermined value may be defined according to the PPS standards. As an example, the predetermined value may set to, but not limited to, 500 millivolts (mV). When determining that the amount of change in requested voltage is greater than the predetermined value, the controller 110 may directly send the request accept message to the power receiving device 300 through the UFP 130 for responding to the first power request message, and send the first power request message to the power supplying device 200 through the DFP 120.

When determining that the amount of change in requested voltage is not greater than the predetermined value, the controller 110 is arranged to start the first waiting timer for delaying the transmitting time of the request accept message, and drive the DFP 120 during the waiting period (for the first waiting time corresponding to the first waiting timer) so as to send the first power request message to the power supplying device 200 through the DFP 120. In the embodiments of the invention, before the first waiting timer expires, the controller 110 is arranged to temporarily not send a request accept message to the power receiving device 300 through the UFP 130, but provide the first power request message to the power supplying device 200 through the DFP 120. When the first waiting timer expires, the controller 110 is arranged to send the request accept message to the power receiving device 300 through the UFP 130 for responding to the first power request message.

According to an embodiment of the invention, the first waiting timer may be set to the time required for the power supplying device 200 to reply a request accept message in response to a power request message. To be more specific, according to an embodiment of the invention, after the PD link is established, the controller 110 may actively send a power request message to the power supplying device 200 and may start to count the time that the power supply device 200 receives the power request message and sends back a request accept message, so as to obtain the time required for the power supplying device 200 to reply a request accept message in response to a power request message. The controller 110 may set the first waiting timer based on the obtained result.

Generally, when the power supplying device 200 receives a power request message, the power supplying device 200 may also evaluate whether the power requested by the sink device is available power, and may send a request accept message to the sink device to respond to this power request message after determining that the power requested by the sink device is available power, and may start to perform power adjustment based on the requested power. After the power adjustment is completed, the power supplying device 200 may send a power ready message to the sink device to inform that the power is ready, and start to supply the power requested by the sink device.

In the embodiments of the invention, when the power type requested by the power receiving device 300 is PPS and the amount of change in requested voltage is not greater than a predetermined value, the dongle 100 will delay the time to send the request accept message, e.g., to the time when the first waiting timer expires. In this manner, the time it takes for the power supplying device 200 to evaluate the power and reply the request accept message will be excluded from the 25 milliseconds specified by the PPS standard, which helps the combination of the dongle 100 and the power supplying device 200 to meet the requirements of completing such power adjustment within 25 milliseconds.

In addition, generally, the dongle may be equipped with a voltage detection circuit, such as an analog-to-digital conversion circuit, for detecting whether the level of the power currently supplied by the power supplying device 200 meets the demand of the power receiving device 300. However, since the voltage adjustment step defined by the PPS standard is 0.02V, which is smaller than the resolution or accuracy of the voltage detection circuit configured inside a general dongle for voltage detection (note that the resolution or accuracy of the voltage detection circuit depends on the hardware specifications of the dongle), the timing requirements of PD in the PPS standards may be violated. To avoid violating the time specified by the PPS standards, during the procedure of fine-tuning or trimming the voltage requested by the power receiving device 300, the controller inside the dongle may directly trigger a Power Good Interrupt such that the Vbus of the dongle configured to delivery power will be set in a ready state and will deliver the power ready message in advance of the actual power adjustment supposed to be performed by the power supplying device.

To solve this problem, according to an embodiment of the invention, when the aforementioned first waiting timer is expired, or after the controller 110 sends the request accept message to the power receiving device 300 through the UFP 130, the controller 110 may be arranged to start a second waiting timer, and when the second waiting timer expires, the controller 110 is arranged to determine whether the DFP 120 has received a power ready message from the power supplying device 200. When it is determined that the DFP 120 has received the power ready message from the power supplying device 200, the controller is arranged to send the power ready message to the power receiving device 300 through the UFP 130. If the DFP 120 has not received the power ready message from the power supplying device 200 before the second waiting timer is expired, the power supplying device 200 is unable to complete the power adjustment task within the time specified by the standard and the PD link has to be reestablished. Therefore, the controller 110 may initiate a reset procedure to reestablish a power delivery link with the power supplying device or the power receiving device. According to an embodiment of the invention, operations in the reset procedure may be similar to that of the aforementioned initialization procedure. As an example, the controller 110 may re-perform whole or a part of operations in the initialization procedure. In this manner, the problem of insufficient resolution or accuracy of the voltage detection circuit is solved, and the PD operations of the dongle meet the PD timing requirements specified in the PPS standards as well.

According to an embodiment of the invention, the second waiting timer may be set to 25 ms to comply with the limitation of the time for power adjustment specified in the PPS standards. However, the invention is not limited to set the second waiting timer to 25 ms. As an example, the second waiting timer may be properly designed based on the requirements of the power delivery system. According to an embodiment of the invention, the second waiting timer may be set to the time required for the power supplying device 200 to perform power adjustment in response to a power request message. To be more specific, according to an embodiment of the invention, after the PD link is established, the controller 110 may actively send a power request message to the power supplying device 200 and may start to count the time required for the power supplying device 200 to perform power adjustment, so as to obtain the time required for the power supplying device 200 to perform power adjustment in response to a power request message and set the second waiting timer based on the obtained result, or the controller 110 may count the time from the power supplying device 200 replying a request accept message in response to the power request message to the power supplying device 200 sending a power ready message, so as to obtain the time required for the power supplying device 200 to perform power adjustment (which is started from the power supplying device 200 replying the request accept message), and the controller 110 may set the second waiting timer based on the time required for the power supplying device 200 to perform power adjustment.

Besides the first waiting timer and the second waiting timer, according to an embodiment of the invention, for meeting the keep alive requirement specified by the PPS standards even when the power supplying device 200 and the power receiving device 300 are indirectly connected through the dongle 100, the controller 110 may respectively set a corresponding timer for the DFP 120 and the UPF 130 of the dongle, and make the DFP 120 and the UPF 130 to respectively act as a sink device and a source, so as to assist the power supplying device 200 and the power receiving device 300 to maintain the PPS PD connection.

According to an embodiment of the invention, after the PD link is established, the controller 110 is further arranged to start a third waiting timer, and when the third waiting timer expires, the controller 110 is arranged to determine whether the UFP 130 has received any power request message from the power receiving device 300. When determination result shows yes, it means that the power receiving device 300 is still keeping the PD link and the controller 110 may perform the associated processing in response to the received power request message. As an example, processing the received power request message as described in the aforementioned embodiments. When determination result shows no, that is, when determining that the UFP 130 has not received any power request message from the power receiving device 300 before the third waiting timer is expired, it means that the UFP 130 is now disconnected, and the controller 110 may initiate a reset procedure to reestablish a power delivery link with the power receiving device 300. It is to be noted that, in the embodiments of the invention, the controller 110 may repeatedly restart the third waiting timer and perform the determination and the associated operations as discussed above every time when the third waiting timer expires, for making the power receiving device 300 to meet the keep alive requirement specified by the PPS standards.

According to an embodiment of the invention, the third waiting timer may be set to 12-15 seconds to comply with the requirements specified in the PPS standards. However, the invention is not limited to set the third waiting timer to 12-15 seconds. As an example, the third waiting timer may be properly designed based on the requirements of the power delivery system.

In addition, according to an embodiment of the invention, after the PD link is established, the controller 110 is further arranged to start a fourth waiting timer, and when the fourth waiting timer expires, the controller 110 is arranged to determine whether a power request message or a communication message has been sent to the power supplying device 200 before the fourth waiting timer expires. When determination result shows yes, it means that both the power receiving device 300 and the power supplying device 200 are still communicating with each other and the controller 110 may perform the associated processing in response to the received message. When determination result shows no, it means that none of the power request message and the communication message being sent to the power supplying device 200 through the dongle 100 before the fourth waiting timer expires, and the controller 110 may actively generate a power request message and send it to the power supplying device 200 through the DFP 120, so as to keep the PD link with the power supplying device 200. It is to be noted that, in the embodiments of the invention, the controller 110 may repeatedly restart the fourth waiting timer and perform the determination and the associated operations as discussed above every time when the fourth waiting timer expires, for making the power receiving device 300 to meet the keep alive requirement specified by the PPS standards.

According to an embodiment of the invention, the fourth waiting timer may be set to 10 seconds to comply with the requirements specified in the PPS standards. However, the invention is not limited to set the fourth waiting timer to 10 seconds. As an example, the fourth waiting timer may be properly designed based on the requirements of the power delivery system.

Figure 2:
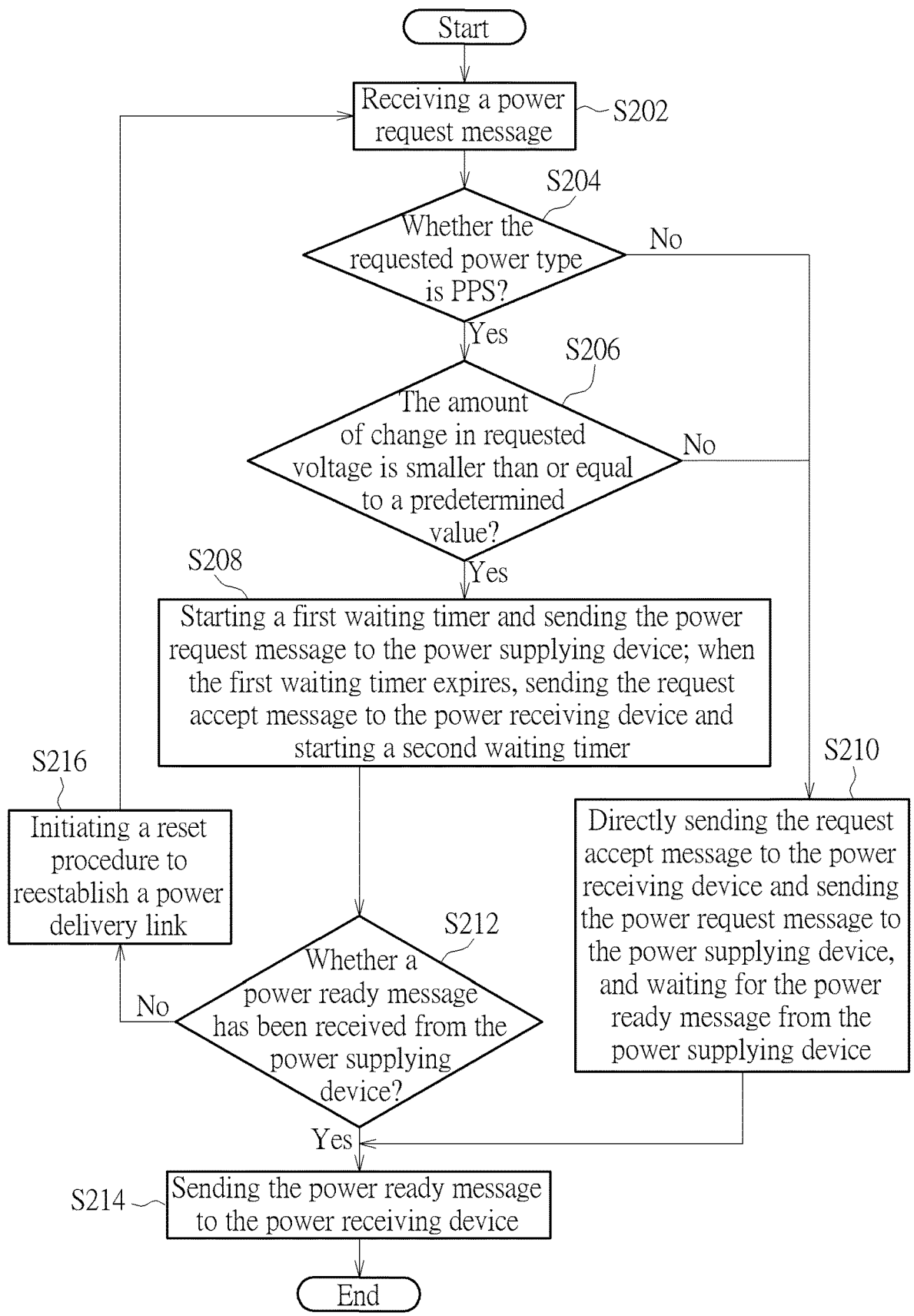
FIG. 2 shows a flow chart of a method for controlling power delivery according to an embodiment of the invention.

FIG. 2 shows a flow chart of a method for controlling power delivery according to an embodiment of the invention. The method comprises the following steps performed by the controller 110:

Step S202: a power request message is received from a power receiving device.

Step S204: whether a power type requested by the power receiving device is PPS is determined according to the received power request message. When determination result shows yes, step S206 is performed. When determination result shows no, step S210 is performed. It is to be noted that as discussed above, this embodiment is provided on the basis that the power requested by the power receiving device is available power for the dongle.

Step S206: an amount of change in requested voltage is determined based on the power request message and a previously received power request message and whether the amount of change in requested voltage is smaller than or equal to a predetermined value is determined. When determination result shows yes, step S208 is performed. When determination result shows no, step S210 is performed. It is to be noted that in another embodiment of the invention, the determination in step S206 may also be skipped. That is, when determination result in step S204 shows yes, step S208 is performed.

Step S208: a first waiting timer is started and the power request message is sent to the power supplying device at the same time; when the first waiting timer expires, the request accept message is sent to the power receiving device and a second waiting timer is started. When the second waiting timer expires, step S212 is performed.

Step S210: the request accept message is directly sent to the power receiving device and the power request message is sent to the power supplying device. Then, the controller may wait for the power ready message sent by the power supplying device after the power adjustment is completed and perform step S214 when the ready message is received.

Step S212: whether a power ready message has been received from the power supplying device is determined when the second waiting timer expires. When determination result shows yes, step S214 is performed. When determination result shows no, step S216 is performed.

Step S214: the power ready message is sent to the power receiving device.

Step S216: a reset procedure is initiated to reestablish a power delivery link. When the power delivery link is reestablished, the controller may wait for the power request message from the power receiving device and re-perform step S202.

Figure 3:
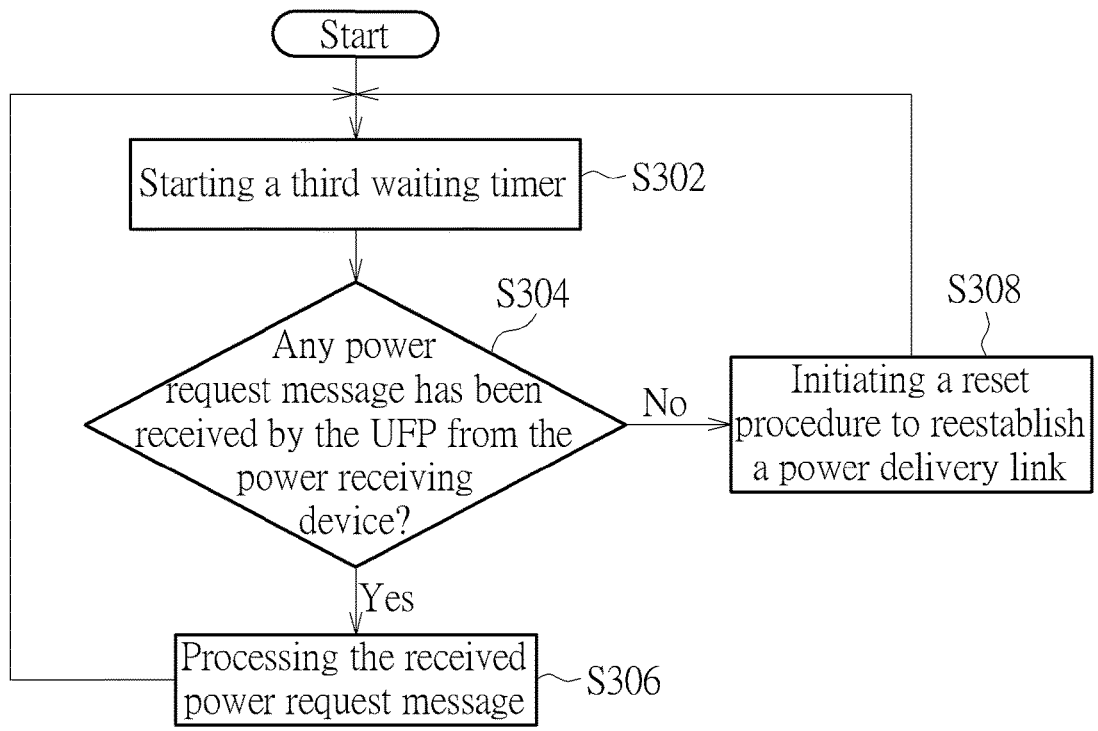
FIG. 3 shows a flow chart of a method for controlling power delivery between the power receiving device and the power supplying device according to another embodiment of the invention.

FIG. 3 shows a flow chart of a method for controlling power delivery between the power receiving device and the power supplying device according to another embodiment of the invention. This method may be applied for the power receiving device 300 as shown in FIG. 1 to meet the keep alive requirement specified by the PPS standard and may be performed at the same time with the method illustrated in FIG. 2. The method comprises the following steps performed by the controller 110:

Step S302: a third waiting timer is started after the PD link is established. When the third waiting timer expires, step S304 is performed.

Step S304: whether any power request message has been received by the UFP from the power receiving device is determined. When determination result shows yes, step S306 is performed. When determination result shows no, step S308 is performed.

Step S306: associated processing is performed in response to the received power request message and then step S302 is returned to restart the third waiting timer.

Step S308: a reset procedure is initiated to reestablish a power delivery link, and when the power delivery link is reestablished, step S302 is returned to restart the third waiting timer.

Figure 4:
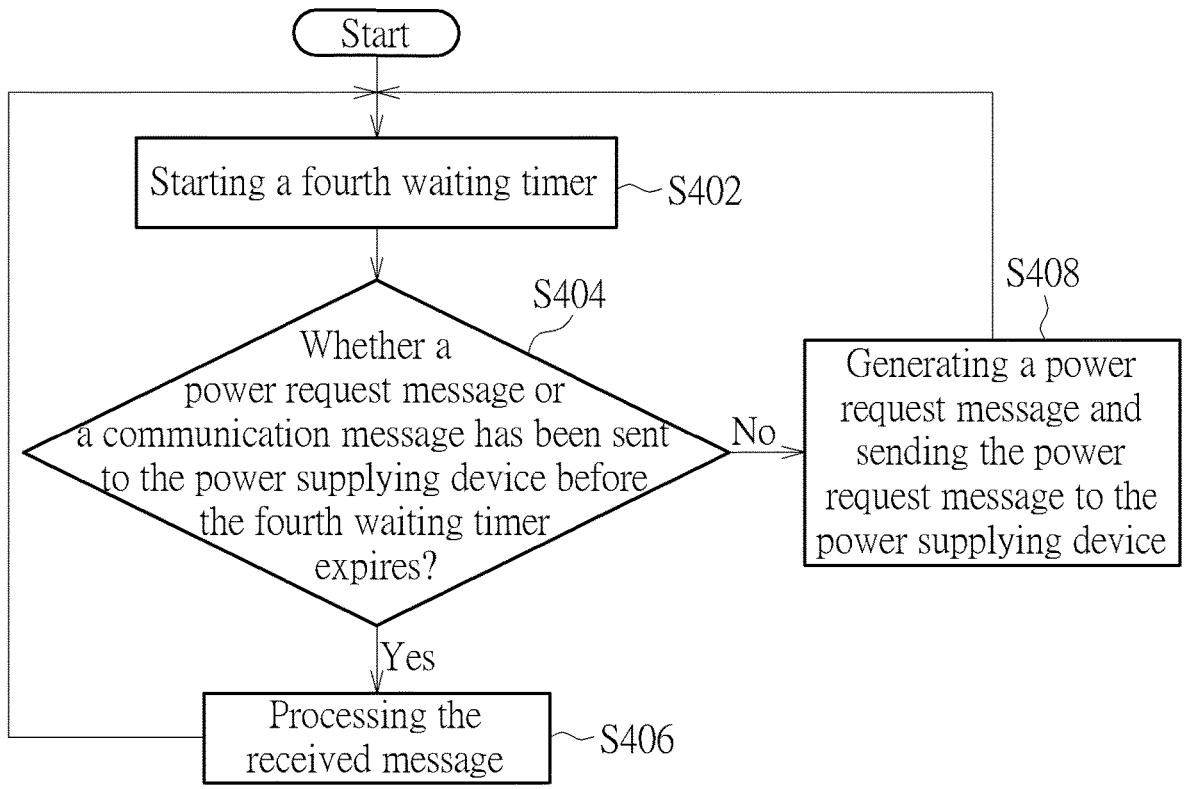
FIG. 4 shows a flow chart of a method for controlling power delivery between the power receiving device and the power supplying device according to yet another embodiment of the invention.

FIG. 4 shows a flow chart of a method for controlling power delivery between the power receiving device and the power supplying device according to yet another embodiment of the invention. This method may be applied for the power supplying device 200 as shown in FIG. 1 to meet the keep alive requirement specified by the PPS standard and may be performed at the same time with the method illustrated in FIG. 2. The method comprises the following steps performed by the controller 110:

Step S402: a fourth waiting timer is started after the PD link is established. When the fourth waiting timer expires, step S404 is performed.

Step S404: whether a power request message or a communication message has been sent to the power supplying device before the fourth waiting timer expires is determined. When determination result shows yes, step S406 is performed. When determination result shows no, step S408 is performed.

Step S406: associated processing is performed in response to the received message and step S402 is returned to restart the fourth waiting timer.

Step S408: power request message is generated and sent to the power supplying device through the DFP 120 for keeping the PD link with the power supplying device 200. Then, step S402 is returned to restart the fourth waiting timer.

Figure 5:
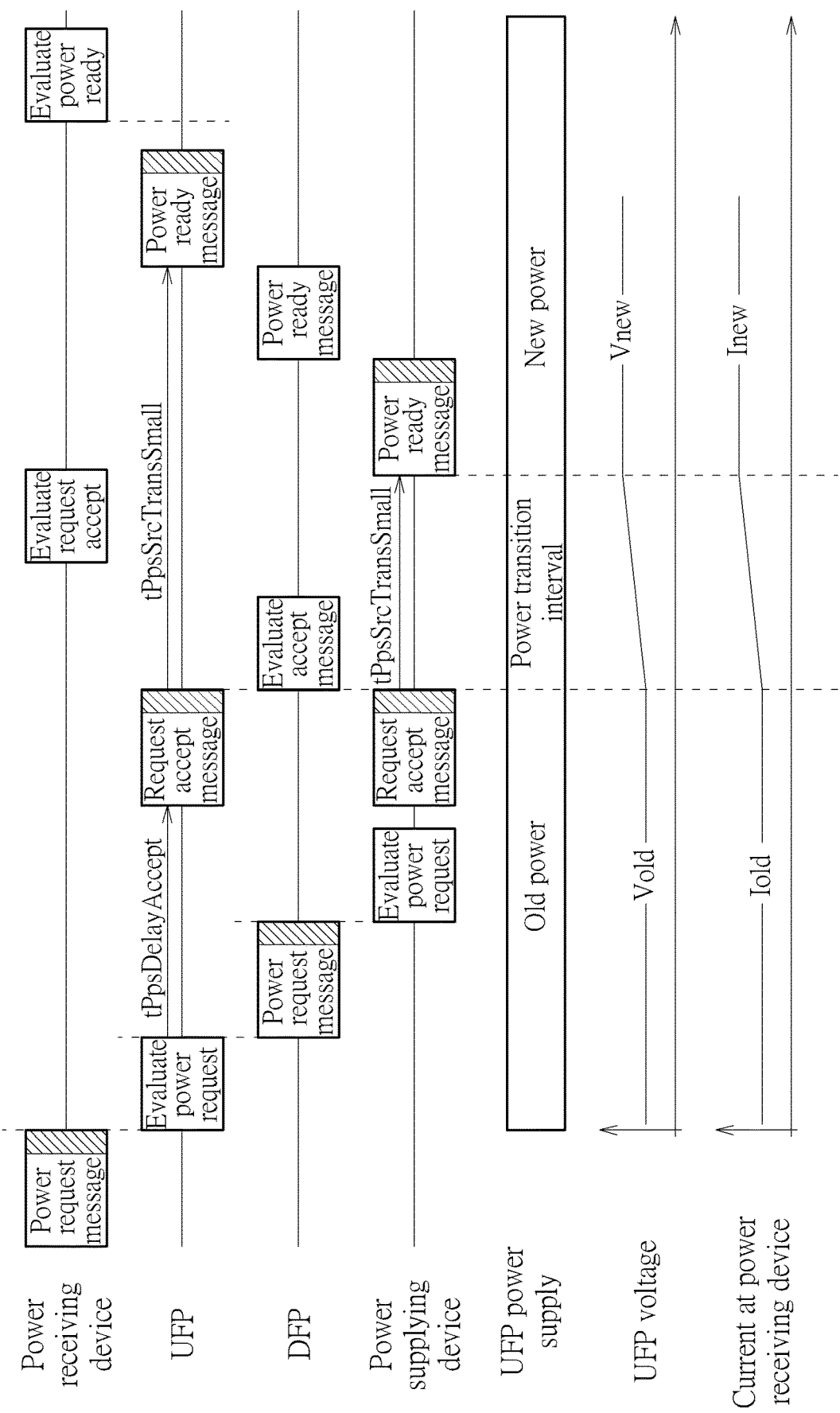
FIG. 5 is a schematic diagram showing the processing flows when the amount of change in the requested voltage of a power receiving device in the power delivery system is not greater than a predetermined value according to an embodiment of the invention.

FIG. 5 is a schematic diagram showing the processing flows when the amount of change in the requested voltage of a power receiving device in the power delivery system is not greater than a predetermined value according to an embodiment of the invention. The upper portion of FIG. 5 shows the delivery of the message in the power delivery system, and also shows the corresponding operations performed by the power receiving device, the UFP, the DFP and the power supplying device in response to the received message. The lower portion of FIG. 5 shows the transition of power, voltage and current between the UFP and UFP.

As shown in FIG. 5, after the power receiving device issues a power request message, the UFP of a dongle (as an example, the UFP strategy engine controlled by the controller 110, or the controller 110 itself) may evaluate the power request and start a waiting timer tPpsDelayAccept, and also drive the DFP (as an example, the DFP strategy engine controlled by the controller 110, or the controller 110 itself) at the same time to send the power request message to the power supplying device. Upon receiving the power request message, the power supplying device may evaluate the power request and issue a request accept message or an evaluate accept message after the evaluation. The DFP receives the request accept message or the evaluate accept message issued by the power supplying device. On the other hand, when the waiting timer tPpsDelayAccept expires, the UFP sends the request accept message to the power receiving device, and the power receiving device may further evaluate the request accept message after receiving the request accept message.

According to an embodiment of the invention, length of the waiting timer tPpsDelayAccept may be adjusted according to the time required for the power supplying device to reply a request accept message in response to a power request message. In addition, the time for the UFP to send the request accept message to the power receiving device may be earlier or later than the time when the DFP receives the request accept message or the evaluate accept message issued by the power supplying device.

After the request accept message is sent to the power receiving device, the UFP may start another waiting timer tPpsSrcTransSmall. Meanwhile, the power supplying device may start performing power adjustment after sending the request accept message and may send a power ready message when the power adjustment is completed. When the waiting timer tPpsSrcTransSmall expires, the controller may determine whether the DFP has received the power ready message from the power supplying device. When determining that the DFP has not received the power ready message from the power supplying device, the controller may initiate a reset procedure to reestablish a power delivery link. When determining that the DFP has received the power ready message from the power supplying device, the UFP may then send the power ready message to the power receiving device. After receiving the power ready message, the power receiving device may evaluate the power ready message.

According to an embodiment of the invention, length of the waiting timer tPpsSrcTransSmall may be set based on the time required for the power supplying device to send a power ready message after replying the request accept message.

As shown in the lower portion of FIG. 5, the UFP power may experience the transition interval due to the power adjustment from the old power to the new power of the power supplying device. The voltage at the Vbus for delivery power transits from old voltage (Vold) gradually to the new voltage (Vnew) as the curve of the UFP voltage shown in FIG. 5. In addition, the current at the power receiving device transits from old current (Iold) gradually to the new current (Inew) as well.

With the proposed dongle and the associated method for controlling power delivery, a dongle capable of supporting power delivery of PPS is implemented and the problems encountered when a general dongle is used for PPS power delivery can be effectively solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dongle, coupled between a power supplying device for supplying power and a power receiving device for receiving the power, comprising:
   a downstream facing port (DFP), arranged to be coupled to the power supplying device;
   an upstream facing port (UFP), arranged to be coupled to the power receiving device; and
   a controller, coupled to the DFP and the UFP and arranged to control deliveries of the power and messages between the power supplying device and the power receiving device,
   wherein in response to a first power request message received from the power receiving device, the controller is arranged to determine whether a power type request by the power receiving device is Programmable Power Supply (PPS) according to the first power request message, and when determining that the power type request by the power receiving device is PPS, the controller is arranged to start a first waiting timer, and when the first waiting timer expires, the controller is arranged to send a request accept message to the power receiving device through the UFP.

2. The dongle of claim 1, wherein before the first waiting timer expires, the controller is arranged not to send the request accept message to the power receiving device through the UFP.

3. The dongle of claim 1, wherein when determining that the power type request by the power receiving device is not PPS, the controller is arranged to directly send the request accept message to the power receiving device through the UFP.

4. The dongle of claim 1, wherein in response to the first power request message received from the power receiving device, the controller is further arranged to provide the first power request message to the power supplying device through the DFP.

5. The dongle of claim 1, wherein when determining that the power type request by the power receiving device is PPS, the controller is further arranged to determine an amount of change in requested voltage based on the first power request message and a previously received power request message and determine whether the amount of change in requested voltage is greater than a predetermined value, wherein when determining that the amount of change in requested voltage is greater than the predetermined value, the controller is arranged to directly send the request accept message to the power receiving device through the UFP, and when determining that the amount of change in requested voltage is not greater than the predetermined value, the controller is arranged to start the first waiting timer and send the request accept message to the power receiving device through the UFP when the first waiting timer expires.

6. The dongle of claim 1, wherein when the first waiting timer expires, the controller is further arranged to start a second waiting timer and when the second waiting timer expires, the controller is arranged to determine whether the DFP has received a power ready message from the power supplying device, and when determining that the DFP has not received the power ready message from the power supplying device, the controller is arranged to initiate a reset procedure to reestablish a power delivery link with at least one of the power supplying device and the power receiving device.

7. The dongle of claim 6, wherein when determining that the DFP has received the power ready message from the power supplying device, the controller is arranged to send the power ready message to the power receiving device through the UFP.

8. The dongle of claim 1, wherein the controller is further arranged to start a third waiting timer, and when the third waiting timer expires, the controller is arranged to determine whether the UFP has received a second power request message from the power receiving device, and when determining that the UFP has not received the second power request message from the power receiving device, the controller is arranged to initiate a reset procedure to reestablish a power delivery link with the power receiving device.

9. The dongle of claim 1, wherein the controller is further arranged to start a fourth waiting timer, and when the fourth waiting timer expires, the controller is arranged to determine whether a power request message or a communication message has been sent to the power supplying device before the fourth waiting timer expires, and when determining that none of the power request message and the communication message has been sent to the power supplying device before the fourth waiting timer expires, the controller is arranged to send a third power request message to the power supplying device through the DFP.

10. A method for controlling power delivery between a power supplying device and a power receiving device, wherein the power supplying device is arranged to supply power and the power receiving device is arranged to receive the power, and the method comprises:

determine whether a power type request by the power receiving device is Programmable Power Supply (PPS) according to a first power request message received from the power receiving device;

starting a first waiting timer when determining that the power type request by the power receiving device is PPS; and sending a request accept message to the power receiving device when the first waiting timer expires.

11. The method of claim 10, wherein when determining that the power type request by the power receiving device is not PPS, the method further comprises:

directly sending the request accept message to the power receiving device.

12. The method of claim 10, further comprising:

providing the first power request message to the power supplying device in response to the first power request message received from the power receiving device.

13. The method of claim 10, wherein when determining that the power type request by the power receiving device is PPS, the method further comprises:

determining an amount of change in requested voltage based on the first power request message and a previously received power request message and determining whether the amount of change in requested voltage is greater than a predetermined value;

directly sending the request accept message to the power receiving device when determining that the amount of change in requested voltage is greater than the predetermined value; and performing steps of starting the first waiting timer and sending the request accept message to the power receiving device when the first waiting timer expires when determining that the amount of change in requested voltage is not greater than the predetermined value.

14. The method of claim 11, further comprising:

starting a second waiting timer when the first waiting timer expires;

determining whether a power ready message has been received from the power supplying device when the second waiting timer expires; and initiating a reset procedure to reestablish a power delivery link with at least one of the power supplying device and the power receiving device when determining that the power ready message has not been received from the power supplying device.

15. The method of claim 14, further comprising:

sending the power ready message to the power receiving device when determining that the power ready message has been received from the power supplying device.

16. The method of claim 10, further comprising:

starting a third waiting timer;

determining whether a second power request message has been received from the power receiving device when the third waiting timer expires; and initiating a reset procedure to reestablish a power delivery link with the power receiving device when determining that the second power request message has not been received from the power receiving device.

17. The method of claim 10, further comprising:

starting a fourth waiting timer;

determining whether a power request message or a communication message has been sent to the power supplying device before the fourth waiting timer expires; and generating a third power request message and sending the third power request message to the power supplying device when determining that none of the power request message and the communication message has been sent to the power supplying device before the fourth waiting timer expires.

* * * * *